Jan. 26, 1932. J. F. CULP 1,842,897
FILLING ATTACHMENT FOR LIQUID LUBRICANT CONTAINERS
Filed March 13, 1930
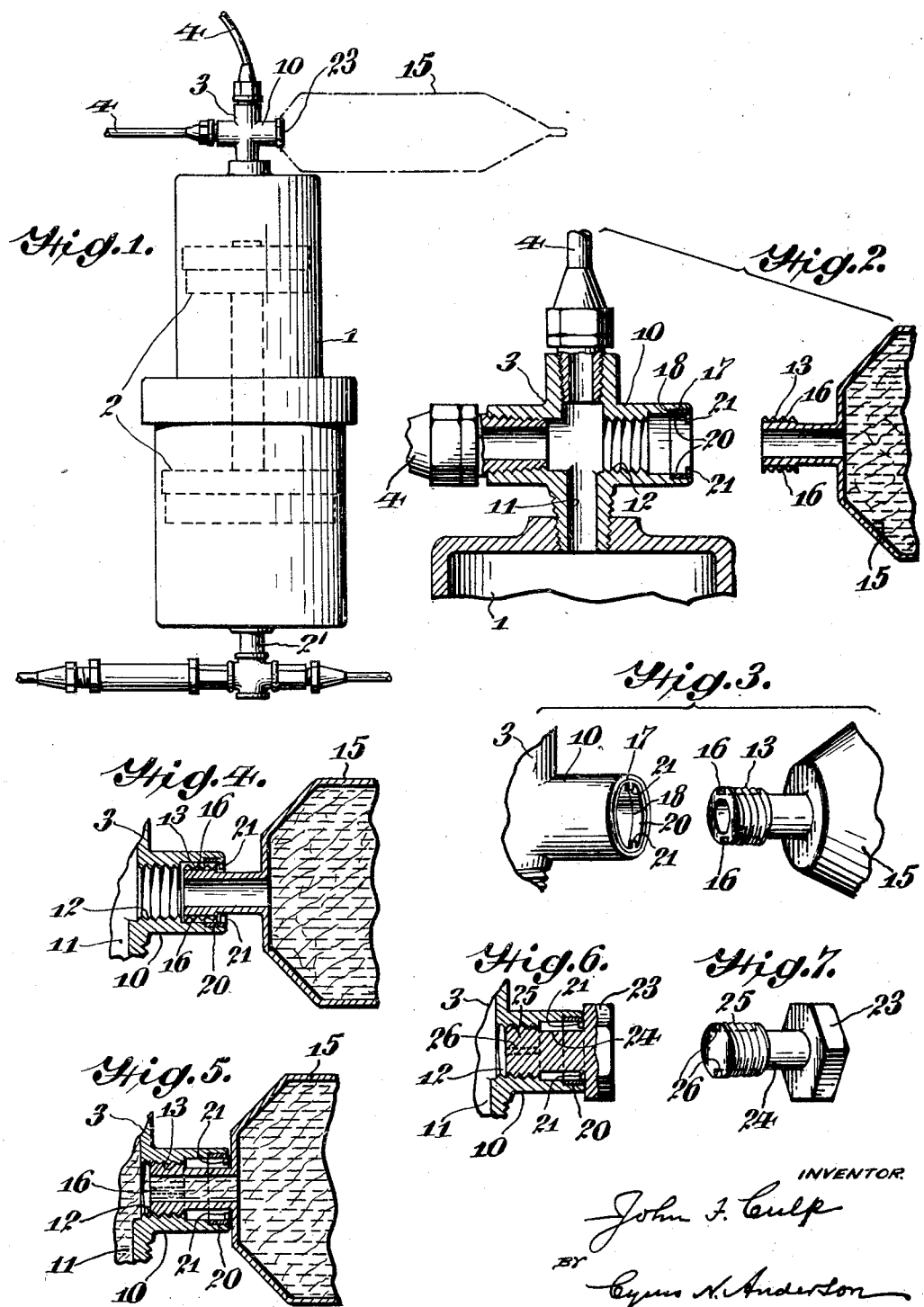

Patented Jan. 26, 1932

1,842,897

UNITED STATES PATENT OFFICE

JOHN F. CULP, OF PHILADELPHIA, PENNSYLVANIA, ASSIGNOR TO IDEAL LUBRICATOR COMPANY, OF PHILADELPHIA, PENNSYLVANIA, A CORPORATION OF DELAWARE

FILLING ATTACHMENT FOR LIQUID LUBRICANT CONTAINERS

Application filed March 13, 1930. Serial No. 435,407.

My invention relates to means or attachments for supplying a flowable lubricant, such as grease or oil, to a reservoir or container for such lubricant. Such a container may constitute a part of lubricating systems such as those disclosed in Letters Patent of the United States No. 1,680,936, issued August 14, 1928, and in an application of Youel V. Carpenter for Letters Patent for improvements in Lubricating systems filed January 25, 1929, Serial Number 334,912.

As heretofore constructed, the openings into or the means by which lubricant may be supplied to such container or reservoir has been of a character such that anyone might supply the same. The result of this condition is that it happens not infrequently that an inferior lubricant is furnished in consequence of which proper lubrication is or may not be provided.

The general object of the invention is to provide means whereby only those authorized to do so shall be able to supply to a container a lubricant of the character heretofore suggested.

My invention comprises an attachment which is adapted to be mounted in an opening leading through a wall of a lubricant container, the said attachment having an opening therethrough and also having means whereby only nozzles or discharge nipples of lubricant supply reservoirs having a certain construction may be connected with said attachment for discharging lubricant therethrough into the said lubricant container.

Other objects of the invention will be set forth fully in the detailed description thereof which follows or will be apparent from such description.

In order that the invention may be readily understood and its practical advantages fully appreciated, reference should be had to the accompanying drawings wherein I have illustrated an embodiment of the invention in the form at present preferred by me.

In the drawings:

Fig. 1 is a view in side elevation of a lubricant container provided with an attachment embodying my invention through which lubricant may be discharged into the said container from a supply reservoir;

Fig. 2 is a view in central vertical section of the upper portion of the said container and of the protective filling attachment mounted thereon, and also showing in section a portion of a reservoir from which lubricant is supplied to the said lubricant container;

Fig. 3 is a view in perspective of a portion of the attachment and of a portion of a reservoir for supplying lubricant through the opening in the said attachment to the said lubricant container, the two parts being located in spaced relation to each other ready to be assembled into cooperative relation;

Fig. 4 is a sectional view of the parts shown in Fig. 3 showing them in the act of being assembled;

Fig. 5 is a sectional view showing the said parts in assembled relation;

Fig. 6 is a sectional view showing a portion of the attachment having a closing plug mounted therein; and Fig. 7 is a perspective view of the closing plug shown in Fig. 6.

In the drawings I have shown at 1 a container of known construction having therein a double piston 2 shown in dash lines.

The upper portion of the container is adapted to receive and hold the lubricant to be distributed to the bearings for lubricating the latter, while the lower portion thereof is adapted to be supplied from a pipe 2' with a suitable fluid under pressure which acts upon the underside of the lower of the two heads of the piston 2 to cause movement of the piston to effect discharge of the flowable lubricant from the said container through an attachment 3 and from the latter through one or more pipes 4 and from the latter ultimately to the bearings (not shown) for lubricating the latter. The attachment also provides means for permitting a supply of the lubricant to the upper portion of the container 1.

As has been indicated already, it heretofore has been the case that the means provided for permitting a supply of flowable lubricant to the lubricant container, from which distribution is made to the bearings to be lubricated, has been of a character such that the lubricant might be supplied by anyone or from any source; also, as has been indicated previously herein, it has happened and does happen that lubricant of inferior grade is supplied to the container with the result that proper lubrication of the bearings is not effected.

The improvement which I have invented provides means which is adapted to and is capable of preventing any unauthorized person from supplying lubricant to the container. To that end I have provided the attachment 3 with a nipple 10 having an opening therein through which the lubricant is adapted to be supplied to the main opening 11 of the attachment through which a lubricant is supplied and through which also it is discharged for distribution. The nipple 10 is provided with an internally screw-threaded inner end portion 12, as shown, with which is adapted to be engaged the externally screw-threaded outer end portion 13 of a supply nozzle leading from a lubricant supply reservoir 15. The external screw threads upon the outer end portion of the nozzle 13 are provided with oppositely disposed notches or slots 16, the purpose of which will be hereinafter made clear.

The outer end portion of the opening through the nipple 10 is enlarged so as to permit the insertion therein of a tapping tool for forming the internal screw threads 12 upon the inner portion of the said nipple.

The presence of the enlarged outer end portion 17 of the opening through the nipple 10 provides a shoulder 18 with which the inner edge of a ring 20 is in contact. The ring 20 is of a size permitting it to be driven into the enlarged outer end portion of the opening through the nipple 10, and having been once driven thereinto it may not be removed except by its destruction. The outer edge of the said ring is provided with inwardly extending projections 21 located in diametrically opposed relation to each other which are adapted to register with and to pass through the notches or slots 16 which extend crosswise of the external screw threads upon the outer end portion of the discharge nozzle 13. The distance between the opposing inner ends of the projections 21 is less than the diameter of the outer edges of the screw threads upon the outer end portion 13. It follows, therefore, that but for the presence of the notches or slots 16 it would be impossible to insert the outer end of the nozzle 13 into the opening in the nipple 10. The presence of the said notches or slots, however, permits its insertion and permits the engagement of the external screw threads upon the outer end portion 13 with the internal screw threads 12. These parts having been engaged the lubricant may be forced from the reservoir 15 through the opening 11 into the upper part of the container 1. The double headed piston at that time is located with the lower larger head thereof in adjoining relation to the bottom of the lower portion of the container 1.

When the desired amount of lubricant has been supplied to the container through the openings provided therefor in the attachment 3, the nozzle may be unscrewed and removed from the nipple 10 after which the opening through the said nipple may be closed by means provided therefor.

The means provided for closing the said opening consists of a member having a head 23 provided with a stem portion 24, the outer end of which terminates in an enlarged externally screw-threaded portion 25 provided with slots or notches 26 which extend transversely of the screw threads. The presence of these notches permits the insertion of the screw-threaded portion 25 past the projections 21 so that the said screw-threaded portion 25 may be caused to engage screw-threadedly the internal screw-threaded portion 12 of the nipple 10. By screwing the portion 25 inwardly the inner side of the head 23 is caused to contact with the outer edge of the open end of the nipple 10 to close the opening therethrough. The head 23 is shown in closed position in Fig. 6 of the drawings.

It will be seen that by my invention I have provided means whereby only those having a nozzle, such as is shown at 13, which has connection with the reservoir, such as 15, for lubricant may supply lubricant to the container for distribution to the bearings to be lubricated.

By the employment of my invention anyone who may install upon an automobile or other machine a system for lubricating the bearings thereof may be assured of the control of the lubricant employed in the said systems and may thereby prevent the use of a lubricant which is of inferior quality or character.

Although I have described my invention in connection with a container forming part of a system for the lubrication of the bearings of an automobile structure or the bearings of a machine of any other type it will be understood that devices or attachments embodying the invenion may be employed in connection with and in relation to any other container to which it is necessary or to which it may be desired to supply at intervals a flowable material of any kind.

In connection with the lubricaiton of the bearings of automobiles or other machines the term "flowable" employed herein is intended to comprehend not only heavy and highly viscous greases and oils, but also greases and oils which are less viscous and which may be somewhat mobile and more readily flowable than are the said heavy greases and oils.

Having thus described my invention what

I claim and desire to secure by Letters Patent is:

1. An attachment for containers through which flowable material is adapted to be supplied to the said container, comprising a nipple secured to said container and having an opening therethrough which is in communication with the interior of said container, the inner end portion of said opening being screw-threaded and the outer end portion thereof being enlarged, and projections extending part way across the outer end of said opening.

2. An attachment for containers through which flowable material is adapted to be supplied to the said containers, said attachment having a nipple provided with an opening therethrough, the inner end of which opening is provided with screw threads, the outer end of said opening being enlarged and the said nipple having projections extending part way across the said opening, a supply reservoir for the said flowable material, a nozzle having connection with the said reservoir, the outer end of said nozzle being enlarged and being externally screw-threaded and having notches extending crosswise of the threads of the said screw-threaded portion, the diameter of the helixes of the screw threads of the said screw-threaded portion being greater than the distance between the ends of the projections which extend part way across the outer open end of the opening through the said nipple.

3. An attachment for a container for a flowable lubricant through which said lubricant is supplied to the said container, the said attachment having a nipple projecting therefrom, which nipple is provided with an opening extending therethrough and having communication with an opening leading into the said container, the inner end portion of the said nipple being internally screw-threaded and the outer end of the portion through said nipple being enlarged, diametrically opposed projections provided upon the outer end of the said nipple and projecting inwardly toward each other, a reservoir for holding a supply of a flowable lubricant, and a nozzle having connection with the said reservoir, the outer end of said nozzle being enlarged and externally screw-threaded, the diameter of the enlarged portion being greater than the distance between the inner opposing ends of the said projections and the said enlarged portion having notches extending lengthwise thereof and cutting through the screw threads provided thereon, whereby when the said nozzle is placed in position with the said notches registering with the projections upon the outer end of the said nipple the said enlarged portion of the nozzle may be inserted into the opening through the said nipple and engaged with the internal screw threads of the said nipple.

4. An attachment for a container adapted to contain a lubricant for distribution to the bearings of an automobile or other machine, the said attachment comprising a screw-threaded projection in engagement with an opening in the said container, the said projection having an opening therethrough, said attachment having a nipple having an opening therethrough which is in communication with the opening leading into the said container, the inner end portion of the said nipple being internally screw-threaded and the outer end of the opening through said nipple being enlarged, a member irremovably mounted within the enlarged outer end of the said opening, said member having projections upon the outer edge thereof, which projections extend inwardly crosswise of the said nipple, a reservoir for supplying a flowable lubricant to the said container, and a tubular member having connection with the said reservoir, said tubular member having at its outer end an externally screw-threaded portion, the external diameter of the said screw threads being greater than the distance between the said projections and the said screw-threaded portion having notches in the outer side thereof, said notches extending crosswise of the threads of said screw-threaded portion so that the said enlarged portion of the said member may be inserted past the said projections into the opening through the said nipple to effect engagement of the said externally screw-threaded portion with the internal screw threads of the said nipple.

In testimony that I claim the foregoing as my invention, I have hereunto signed my name this 10th day of March, 1930.

JOHN F. CULP.